United States Patent
Anders et al.

(10) Patent No.: US 8,606,448 B2
(45) Date of Patent: Dec. 10, 2013

(54) SYSTEM AND METHOD FOR MANAGING POWER IN MACHINE HAVING ELECTRIC AND/OR HYDRAULIC DEVICES

(75) Inventors: Jonathan W. Anders, Peoria, IL (US); Corey L. Gorman, Kobe (JP)

(73) Assignee: Caterpillar Inc., Peoria, IL (US)

( * ) Notice: Subject to any disclaimer, the term of this patent is extended or adjusted under 35 U.S.C. 154(b) by 161 days.

(21) Appl. No.: 13/171,773

(22) Filed: Jun. 29, 2011

(65) Prior Publication Data

US 2013/0006457 A1    Jan. 3, 2013

(51) Int. Cl.
   *B60L 9/00*    (2006.01)
(52) U.S. Cl.
   USPC ................ 701/22; 180/65.285; 903/903
(58) Field of Classification Search
   USPC ...... 701/22, 50; 290/40 A, 40 C; 180/68.285; 903/903
   See application file for complete search history.

(56) References Cited

U.S. PATENT DOCUMENTS

| | | | |
|---|---|---|---|
| 5,898,282 A | 4/1999 | Drozdz et al. | |
| 6,427,107 B1 | 7/2002 | Chiu et al. | |
| 6,666,022 B1 * | 12/2003 | Yoshimatsu et al. | 60/413 |
| 6,745,117 B1 | 6/2004 | Thacher et al. | |
| 6,820,356 B2 * | 11/2004 | Naruse et al. | 37/348 |
| 7,069,673 B2 | 7/2006 | Kagoshima et al. | |
| 7,206,687 B1 | 4/2007 | Huseman | |
| 7,669,413 B2 | 3/2010 | Masayuki et al. | |
| 7,751,954 B2 | 7/2010 | Matsuda et al. | |
| 2003/0226291 A1 * | 12/2003 | Naruse et al. | 37/348 |
| 2005/0246082 A1 | 11/2005 | Masatoshi et al. | |
| 2006/0229786 A1 | 10/2006 | Sawada | |
| 2008/0093864 A1 * | 4/2008 | Kagoshima et al. | 290/40 A |
| 2008/0093865 A1 * | 4/2008 | Komiyama et al. | 290/40 A |
| 2008/0300743 A1 | 12/2008 | Conlon et al. | |
| 2008/0302422 A1 * | 12/2008 | Neveu et al. | 137/3 |
| 2009/0112415 A1 | 4/2009 | Hendryx | |
| 2009/0140574 A1 | 6/2009 | Gorman et al. | |
| 2009/0251090 A1 | 10/2009 | Tanaka et al. | |
| 2009/0319136 A1 | 12/2009 | Anderson | |
| 2010/0076662 A1 | 3/2010 | Sheidler et al. | |
| 2011/0029175 A1 * | 2/2011 | Kang et al. | 701/22 |
| 2011/0056755 A1 | 3/2011 | Kensuke et al. | |
| 2011/0313608 A1 | 12/2011 | Shiho et al. | |
| 2012/0082536 A1 * | 4/2012 | Kawashima et al. | 414/694 |

FOREIGN PATENT DOCUMENTS

| | | |
|---|---|---|
| JP | 2005-163605 A | 6/2005 |
| JP | 2009-127296 A | 6/2009 |
| WO | WO 2008/128416 A1 | 10/2008 |
| WO | 2010114036 | 10/2010 |
| WO | 20100143628 | 12/2010 |

* cited by examiner

*Primary Examiner* — Helal A Algahaim

(74) *Attorney, Agent, or Firm* — Finnegan, Henderson, Farabow, Garrett & Dunner LLP

(57) ABSTRACT

A system for controlling power in a machine includes a controller. The controller is configured to receive request signals indicative of requested operation of at least one of an electric device and a hydraulic device. The controller is further configured to determine a requested level of power required to meet the requested operation and determine an ability of the engine to supply the requested level of power. The controller is further configured to provide control signals to the at least one device to either supply power to the engine or receive power from the engine based on the ability of the engine to supply the requested level of power. The controller is also configured to provide control signals to the engine to control speed and output of the engine, wherein the control signals provided to the engine and the at least one device result in operation of the engine within a speed range of a target engine speed.

25 Claims, 8 Drawing Sheets

SYSTEM AND METHOD FOR MANAGING POWER IN MACHINE HAVING ELECTRIC AND/OR HYDRAULIC DEVICES

TECHNICAL FIELD

The present disclosure relates to a system and method for managing power in a machine having electric and/or hydraulic devices, and more particularly, to a system and method for controlling electric and/or hydraulic devices to assist operation of an internal combustion engine.

BACKGROUND

Some conventional machines have a hydraulic power source for operating hydraulic actuators. For example, such a machine may typically include an internal combustion engine for driving one or more hydraulic pumps, which, in turn, supply power to one or more hydraulic actuators for performing work. One example of such a machine is a hydraulic excavator. A hydraulic excavator may typically include one or more hydraulic pumps, which provide hydraulic power in the form of pressurized fluid flow to one or more hydraulic motors and hydraulic cylinders for operation of a boom, stick, and digging implement. In such a machine, the hydraulic motors may be used to rotate a cab relative to a chassis on which the cab is mounted and drive grounding engaging wheels or tracks for movement of the machine. Hydraulic power provided to the hydraulic actuators may be used to raise and lower the boom and manipulate the stick and the digging implement in order to perform digging and/or loading operations.

To increase the efficiency and/or reduce undesirable emissions resulting from operation of the internal combustion engine, efforts have been made to recapture some of the energy typically lost during operation of such a machine. For example, energy may be recaptured in the form of stored electric and hydraulic energy for use by electric and hydraulic devices. Thus, it may be desirable to perform some working functions in a machine with both stored hydraulic energy and stored electric energy by use of both electric and hydraulic devices. However, in such a machine it may be difficult to control the supply of electric and hydraulic power to the electric and hydraulic devices in a manner that results in desirable performance and/or efficiency. In addition, operation of the electric and hydraulic devices may result in loads being placed on the output of the internal combustion engine resulting in undesirable or inefficient operation of the engine. Therefore, it may be desirable to provide a system and method for managing power in a machine having both electric and hydraulic devices in a manner that results in desirable or efficient operation of the engine.

A hybrid construction machine is disclosed in U.S. Pat. No. 7,669,413 B2 to Komiyama et al. ("the '413 patent"). In particular, the '413 patent discloses a hybrid excavator including a hydraulic pump, a generator motor connected in parallel to an output shaft of an engine, and a rotation motor driven by a battery. The generator motor assists the engine by performing a motor function. Power consumption of each of the hydraulic pump and the rotation motor is detected, and the output of the hydraulic pump and the rotation motor is controlled such that the sum of the detected power consumption does not exceed a maximum supply power set as the sum of power that can be supplied to the hydraulic pump and the rotation motor.

Although the machine disclosed in the '413 patent includes both electric and hydraulic devices, the machine disclosed in the '413 patent may still fail to control the electric and hydraulic devices in the machine in a manner providing desirable machine performance and efficiency. Therefore, it may be desirable to provide a system and method for controlling power in a machine having both electric and hydraulic devices in a manner that results in desirable and efficient operation of the engine.

SUMMARY

In one aspect, the present disclosure includes a system for controlling power in a machine including an engine configured to provide power to at least one of an electric device and a hydraulic device and receive power from the at least one device. The system includes a controller configured to receive request signals indicative of requested operation of the at least one device and determine a requested level of power required to meet the requested operation based on the request signals. The controller is further configured to determine an ability of the engine to supply the requested level of power upon receipt of the request signals and provide control signals to the at least one device to either supply power to the engine or receive power from the engine based on the ability of the engine to supply the requested level of power. The controller is also configured to provide control signals to the engine to control speed and output of the engine, wherein the control signals provided to the engine and the at least one device result in operation of the engine within a speed range of a target engine speed.

According to another aspect, the disclosure includes a method for controlling power in a machine including an electric device configured to provide electric power and consume electric power, a hydraulic device configured to provide hydraulic power and consume hydraulic power, and an engine configured to provide power to the electric and hydraulic devices and receive power from the electric and hydraulic devices. The method includes receiving request signals indicative of requested operation of at least one of the electric and hydraulic devices and determining a requested level of power required to meet the requested operation based on the request signals. The method further includes determining an ability of the engine to supply the requested level of power upon receipt of the request signals, and operating the electric and hydraulic devices to either supply power to the engine or receive power from the engine based on the ability of the engine to supply the requested level of power. The method also includes operating the engine and the electric and hydraulic devices such that the engine is operated within a speed range of a target engine speed.

According to a further aspect, the disclosure includes a machine including a chassis, an operator interface for controlling operation of the machine, and an engine coupled to the chassis. The machine further includes an electric device coupled to the chassis, a hydraulic device coupled to the chassis, and a controller. The controller is configured to receive request signals indicative of requested operation of at least one of the electric and hydraulic devices and determine a requested level of power required to meet the requested operation based on the request signals. The controller is further configured to determine an ability of the engine to supply the requested level of power upon receipt of the request signals and provide control signals to the electric and hydraulic devices to either supply power to the engine or receive power from the engine based on the ability of the engine to supply the requested level of power. The controller is also configured to provide control signals to the engine to control speed and output of the engine, wherein the control signals provided to the engine and electric and hydraulic devices result in operation of the engine within a speed range of a target engine speed.

DETAILED DESCRIPTION

Figure 1:
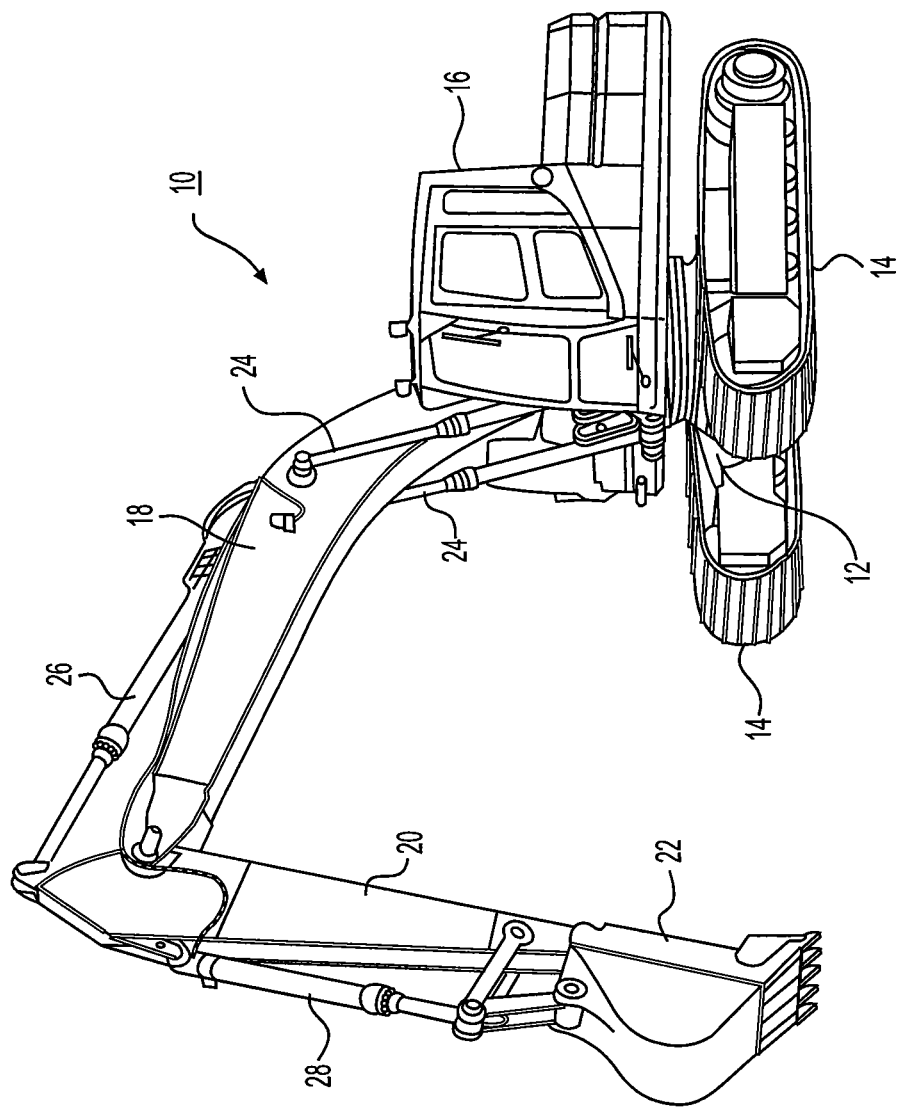
FIG. 1 is a pictorial perspective view of an exemplary embodiment of a machine including an exemplary embodiment of system for controlling power in the machine.

FIG. 1 shows an exemplary embodiment of a machine 10 for performing work. In particular, the exemplary machine 10 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

As shown in FIG. 1, exemplary machine 10 includes a chassis 12 flanked by ground-engaging members 14 for moving machine 10 (e.g., via ground-engaging tracks or wheels). Machine 10 includes an operator cab 16 mounted to chassis 12 in a manner that permits rotation of cab 16 with respect to chassis 12. A boom 18 is coupled to cab 16 in a manner that permits boom 18 to pivot with respect to cab 16. At an end opposite cab 16, a stick 20 is coupled to boom 18 in a manner that permits stick 20 to pivot with respect to boom 18. At an end opposite boom 18, an implement 22 (e.g., a digging implement or bucket) is coupled to stick 20 in a manner that permits implement 22 to pivot with respect to stick 20. Although exemplary machine 10 shown in FIG. 1 includes a digging implement, other tools may coupled to stick 20 when other types of work are desired to be performed.

In the exemplary embodiment shown, a pair of actuators 24 are coupled to cab 16 and boom 18, such that extension and contraction of actuators 24 raises and lowers boom 18, respectively, relative to cab 16. An actuator 26 is coupled to boom 18 and stick 20, such that extension and retraction of actuator 26 results in stick 20 pivoting inward and outward, respectively, with respect to boom 18. Actuator 28 is coupled to stick 20 and digging implement 22, such that extension and retraction of actuator 28 results in digging implement 22 pivoting between closed and open positions, respectively, with respect to stick 20.

Figure 2:
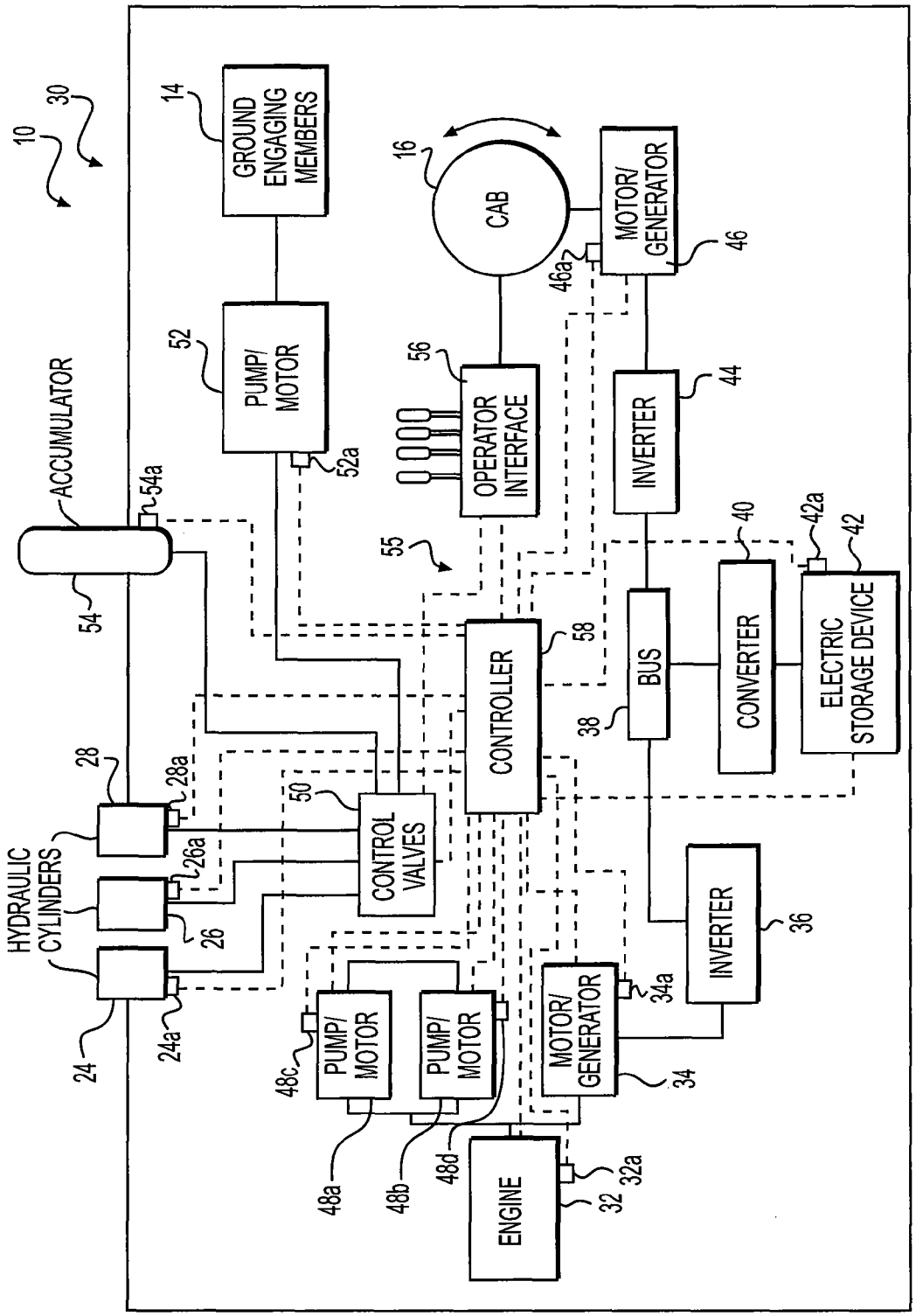
FIG. 2 is a schematic diagram of an exemplary embodiment of a machine including an exemplary embodiment of power system of the machine.

As explained in more detail with respect to FIG. 2, exemplary actuators 24, 26, and 28 are hydraulic devices, in particular, hydraulic cylinders powered by supplying and draining fluid from the cylinders on either side of a piston to cause reciprocating movement of the piston within the cylinder. One or more of actuators 24, 26, and 28 may be non-hydraulic actuators without departing from the concepts disclosed herein. In addition, the number of each of actuators 24, 26, and 28 coupled to boom 18, stick 20, and/or implement 22, respectively, may be changed without departing from the concepts disclosed herein.

Referring to FIG. 2, exemplary machine 10 includes a power system 30 including electric and hydraulic devices operated respectively via electric and hydraulic power sources and controlled by a controller. In particular, exemplary power system 30 includes an internal combustion engine 32. Engine 32 may be, for example, a compression-ignition engine, a spark-ignition engine, a gas turbine engine, a homogeneous-charge compression ignition engine, a two-stroke engine, a four-stroke, or any type of internal combustion engine known to those skilled in the art. Engine 32 may be configured to operate on any fuel or combination of fuels, such as, for example, diesel, bio-diesel, gasoline, ethanol, methanol, or any fuel known to those skilled in the art. Further, engine 32 may be supplemented by a hydrogen-powered engine, fuel-cell, solar cell, and/or any power source known to those skilled in the art.

In the exemplary embodiment shown, power system 30 includes an electric motor/generator 34 (e.g., an AC motor/generator) coupled to engine 32, such that engine 32 drives motor/generator 34, thereby generating electric power. Motor/generator 34 is electrically coupled to an inverter 36 (e.g., an AC-DC inverter), which, in turn, is electrically coupled to a bus 38 (e.g., a DC bus). The exemplary power system 30 further includes a converter 40 electrically coupled to bus 38. Converter 40 may be a DC-DC bi-directional converter, which, in turn, is electrically coupled to an electric storage device 42. Electric storage device 42 may include one or more batteries and/or ultra-capacitors configured to store electric energy supplied from motor/generator 34 and/or or any electrical energy generated by capturing energy associated with operation of machine 10, such as energy captured from regenerative braking of moving parts of 10 machine, such as, for example, ground-engaging members 14 and/or rotation of cab 16. Electric energy stored in electric storage device 42 may be used as a source of electric power as explained in more detail below.

Exemplary power system 30 further includes an inverter 44 (e.g., an AC-DC inverter) coupled to bus 38. Inverter 44 is electrically coupled to an electric motor/generator 46 (e.g., an AC motor/generator). In the exemplary embodiment shown, motor/generator 46 is coupled to cab 16 such that operation of motor/generator 46 results in cab 16 rotating relative to chassis 12. In addition, motor/generator 46 may be capable of slowing and stopping rotation of cab 16 in a regenerative manner that results in electric energy being generated that may be routed via inverter 44, bus 38, and converter 40 to electric storage device 42 for later supply to electric actuators such as motor/generators 34 and 46. According to some embodiments, electric energy in electric storage device 42 may be routed via converter 40, bus 38, and inverter 36 to motor/generator 34, which may then use the electric energy to supplement engine 32 and/or drive one or more of hydraulic pump/motors 48a and 48b, thus enabling electric power sources to assist engine 32 and/or hydraulic devices in machine 10. According to some embodiments, electric energy generated by motor/generator 34 and/or motor/generator 46 may be routed between the two motor/generators 34 and 46 without necessarily being stored in electric storage device 42, for example, by being routed from motor/generator 46, via inverter 44, bus 38, and inverter 36 to motor/generator 34, or from motor/generator 34, via inverter 36, bus 38, and inverter 44 to motor/generator 46.

In the exemplary embodiment shown in FIG. 2, engine 32 is coupled to two hydraulic pump/motors 48a and 48b, which may include fixed-displacement or variable-displacement pumps. Although the exemplary embodiment shown includes two pump/motors 48a and 48b, a single pump/motor or more than two pump/motors may be used. In the exemplary configuration shown, engine 32 supplies mechanical power to drive pump/motors 48a and 48b, which, in turn, provide hydraulic power to power system 30 by causing pressurized fluid to flow to and from hydraulic cylinders 24, 26, and 28. In addition, according to some embodiments, one or more of pump/motors 48a and 48b may supply power to engine 32 to assist with operation of engine 32, for example, to drive motor/generator 34, which may, in turn, supply electric power to electric devices of machine 10.

In the exemplary embodiment shown in FIG. 2, pump/motors 48a and 48b are hydraulically coupled to control valves 50, such that pump/motors 48a and 48b supply pressurized fluid to control valves 50, which, in turn, control fluid flow to and from hydraulic devices of machine 10. For example, as shown in FIG. 2, control valves 50 are hydraulically coupled to hydraulic cylinders 24, 26, and 28, and hydraulic pump/motor 52, which, when supplied with pressurized fluid flow, drive ground-engaging members 14. Although a single hydraulic motor 52 is shown, power system 30 may include one or more hydraulic motors 52, for example, one for each of ground-engaging members 14. Further, hydraulic pump/motor(s) 52 may be capable of slowing and stopping ground-engaging members 14 in a regenerative manner that results in hydraulic energy being generated that may be rerouted to provide hydraulic power to power system 30, stored in a hydraulic storage device for later supply of hydraulic power to hydraulic actuators, and/or to provide hydraulic power to pump/motors 48a and 48b, which may supplement power of engine 32, as explained in more detail below.

Exemplary power system 30 also includes an accumulator 54 hydraulically coupled to control valves 50. Accumulator 54 is configured to store hydraulic energy captured during operation of power system 30. For example, as explained above, hydraulic motor(s) 52 may be configured to slow movement of ground-engaging members 14 by operating as pumps such that ground-engaging members 14 drive the pumps, thereby slowing ground-engaging members 14. The energy supplied to the hydraulic fluid by virtue of the pumping may be routed via control valves 50 for storage in accumulator 54 for later use, and/or to pump/motors 48a and 48b.

In the exemplary power system 30, hydraulic cylinders 24, 26, and 28 are each hydraulically coupled to control valves 50. As explained with respect to FIG. 1, hydraulic cylinders 24, 26, and 28 are respectively coupled to boom 18, stick 20, and implement 22 for manipulating boom 18, stick, 20, and implement 22. Similar to hydraulic motor(s) 52, hydraulic cylinders 24, 26, and 28 may be operated in a regenerative manner that results in hydraulic energy being generated, which may be rerouted to provide hydraulic power to power system 30 and/or stored in accumulator 54. For example, if boom 18 is lowered from an elevated position, pressurized fluid is forced in a controlled manner from hydraulic cylinder 24. This pressurized fluid may be routed via control valves 50 for storage in accumulator 54, and/or to one or more of pump/motors 48a, 48b, and 52 for assisting operation of those hydraulic devices.

Exemplary power system 30 shown in FIG. 2 includes a system 55 for controlling power system 30. For example, power system 30 includes an operator interface 56 that may be contained in cab 16. According to some embodiments, operator interface 56 may be located remote from machine 10 for remote control of machine 10. Exemplary operator interface 56 includes a number of controls (e.g., levers, pedals, and/or buttons) for control of machine 10 and its functions. In the exemplary embodiment shown, operator interface 56 is coupled to control valves 50, electrically and/or hydraulically, so that electric control signals and/or hydraulic control signals (e.g., via a hydraulic pilot circuit) may be sent from operator interface 56 to control valves 50. Such electric and hydraulic control signals may be used to control operation of controls valves 50 for operation and control of the hydraulic devices of power system 30. In addition, operator interface 56 is coupled electrically to a controller 58 configured to control operation of one or more electric and hydraulic devices of exemplary power system 30, as explained in more detail below.

In addition, controller 58 may be coupled to a number of sensors associated with the devices of machine 10 in order to receive signals indicative of the operation of the devices. For example, machine 10 may include the following sensors: engine sensor 32a associated with engine 32, motor/generator sensor 34a associated with motor/generator 34, storage device sensor 42a associated with electric storage device 42, motor/generator sensor 46a associated with motor/generator 46, pump/motor sensors 48c and 48d associated respectively with pump/motors 48a and 48b, hydraulic sensors 24a, 26a, and 28a associated respectively with hydraulic cylinders 24, 26, and 28, accumulator sensor 54a associated with accumulator 54, and pump/motor sensor 52a associated with pump/motor 52. Each of the sensors identified above may include a single sensor or a number of sensors operating together to provide signals indicative of the operation of the associated device.

Engine sensor 32a may include an engine speed sensor, a mass air-flow sensor, an emissions sensor, a manifold pressure sensor, a turbocharger boost pressure sensor, and/or other engine-related sensors. Motor/generator sensors 34a and 46a may include a speed sensor, a current sensor, a voltage sensor, and/or other motor/generator-related sensors. Storage device sensor 42a may include a charge sensor, a current sensor, a voltage sensor, and/or other electric storage device-related sensors. Pump/motor sensors 48c, 48d, and 52a may include a speed sensor, a flow rate sensor, a pressure sensor, and/or other hydraulic-related sensors. Accumulator sensor 54a may include a pressure sensor and/or other hydraulic-related sensors.

Controller 58 may include one or more processors, microprocessors, central processing units, on-board computers, electronic control modules, and/or any other computing and control devices known to those skilled in the art. Controller 58 may be configured run one or more software programs or applications stored in a memory location, read from a computer-readable medium, and/or accessed from an external device operatively coupled to controller 58 by any suitable communications network.

Exemplary controller 58 is configured to control operation of power system 30, including the engine and various electric and hydraulic devices of exemplary machine 10. For example, controller 58 may be configured view each of the electric and hydraulic devices as both potential suppliers and consumers of electric and hydraulic power, and upon receipt of operator requests, control operation of the engine and electric and hydraulic devices in a coordinated manner to provide desired machine performance and efficiency.

For example, electric motor/generators 34 and 46 may operate by either consuming electric power or supplying electric power. They may consume electric power when operated to accelerate a device driven by motor/generators 34 and 46. For example, motor/generator 34 may be driven to assist engine 32 with supplying power to hydraulic pump/motors 48a and 48b, and motor/generator 46 may be driven to rotate cab 16. Motor/generator 34 may also supply electric power to power system 30 when operated to decelerate engine 32 (e.g., when engine 32 is coupled to a flywheel storage device (not shown)), using the generator portion of motor/generator 34 to generate electric power as driven by engine 32. Motor/generator 46 may also operate to supply electric power to power system 30 in a similar manner when decelerating rotation of cab 16. In addition, motor/generators 34 and 46 may supply electric power to each other and to energy storage device 42 when operating in a generator mode.

Energy storage device 42 may also operate as either a supplier or consumer of electric power. For example, energy storage device 42 may operate as a supplier of electric power by providing electric power to motor/generator 34 to assist output of engine 32 and/or to motor/generator 46 to rotate cab 16. Electric storage device 42 may also act as a consumer of electric power when it stores electric power received from motor/generators 34 and 46.

The hydraulic devices may also be viewed as both consumers and suppliers of hydraulic power. For example, pump/motors 48a, 48b, and 52 may operate by either consuming hydraulic power or supplying hydraulic power. They may consume hydraulic power when operated to increase the flow rate and/or pressure in the hydraulic system, for example, to operate hydraulic cylinders 24, 26, and 28 against a load. In addition, pump/motors 48a, 48b, and 52 may operate to consume hydraulic power to drive another of the pump/motors and/or to provide pressurized fluid to accumulator 54. For example, one or more of pump/motors 48a and 48b may operate as a pump to provide fluid to drive pump/motor 52 to drive ground engaging members 14 for moving machine 10.

Pump/motors 48a, 48b, and/or 52 may also supply hydraulic power to power system 30. For example, as motion of the machine 10 is slowed via pump/motor 52, pump/motor 52 may convert the kinetic energy of machine 10 by pumping hydraulic fluid, thereby supplying hydraulic power to power system 30, which may be used by pump/motors 48a and 48b to assist engine 32 with supplying power to electric motor/generator 34, to assist with operation of hydraulic cylinders 24, 26, and 28 against a load, and/or to supply pressurized fluid to accumulator 54 for storage.

Similarly, hydraulic cylinders 24, 26, and 28 may operate to either consume or supply hydraulic power. For example, as boom 18 is lowered, hydraulic cylinder 24 may operate to supply hydraulic power in the form of pressurized fluid to the hydraulic system, which may be used to supply power to pump/motors 48a, 48b, and 52, other hydraulic cylinders 26 and 28, and/or accumulator 54. Hydraulic cylinder 24 may also operate as a power consumer when acting against a load (e.g., to raise boom 18) by drawing hydraulic power from one or more of pump/motors 48a, 48b, and 52, accumulator 54, and/or other hydraulic cylinders 26 and 28.

Accumulator 54 may also operate as either a supplier or consumer of hydraulic power. For example, accumulator 54 may operate as a supplier of hydraulic power by providing pressurized fluid to pump/motors 48a and 48b to assist output of engine 32, to hydraulic cylinders 24, 26, and 28 to act against a load, and/or to pump/motor 52 to drive ground engaging members 14. Accumulator 54 may operate as a consumer of hydraulic power when it stores hydraulic power in the form of pressurized fluid received from pump/motors 48a, 48b, and 52, and/or hydraulic cylinders 24, 26, and 28.

Exemplary controller 58 is configured to receive request signals indicative of requested operation of the electric and hydraulic devices, for example, signals received from operator interface 56, and control electric and hydraulic power in machine 10 according to a control strategy. For example, controller 58 may be configured to receive the request signals from interface 56 and operation signals from the electric and hydraulic devices upon receipt of the request signals. The operation signals are indicative of the status of the respective electric and hydraulic devices at the time of receipt of the request signals. For example, the operation signals may be signals received from the sensors associated with the respective electric and hydraulic devices and may include information about the power being supplied or consumed by the electric and hydraulic devices upon receipt of the request signals. The operation signals may also be indicative of the ability of the electric and hydraulic devices to either provide power or consume power upon receipt of the request signals by controller 58. According to some embodiments, operation signals may also include signals associated with operation of engine 32. Controller 58 may determine the level of power to be supplied or consumed by engine 32 and the electric and hydraulic devices based on the request signals, the operation signals, and the control strategy, and provide control signals for controlling operation of engine 32 and the electric and hydraulic devices of machine 10.

Figure 3:
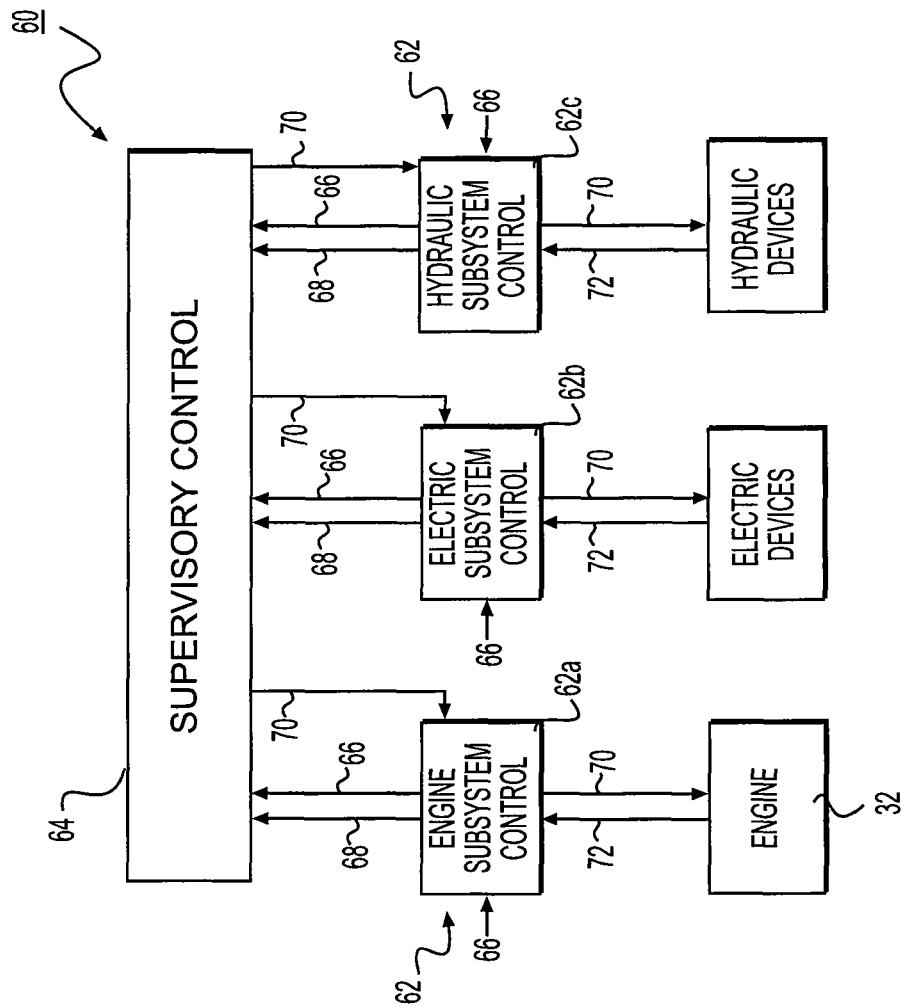
FIG. 3 is a schematic diagram of an exemplary control strategy for operation of an engine and electric and hydraulic devices in an exemplary machine.

FIG. 3 is a schematic diagram of an exemplary control strategy 60 for operation of engine 32 and electric and hydraulic devices in exemplary machine 10. As shown in FIG. 3, exemplary control strategy 60 includes subsystem controls 62 and a supervisory control 64. Exemplary subsystem controls 62 include an engine subsystem control 62a for controlling operation of engine 32, an electric subsystem control 62b for controlling operation of the electric devices of the electric subsystem, and a hydraulic subsystem control 62c for controlling operation of the hydraulic devices of the hydraulic subsystem. Some embodiments may include additional subsystem controls for controlling operation of other devices.

Subsystem controls 62 are configured to provide supervisory control 64 with the request signals 66 indicative of the requested operation of the electric and hydraulic devices. According to some embodiments, supervisory control 64 may receive request signals 66 directly from a source other than subsystem controls 62, such as, for example, interface 56 and/or engine 32 and the electric and hydraulic devices themselves.

Subsystem controls 62 are also configured to provide request and range signals for operation of the energy storage devices associated with the respective electric subsystem and the hydraulic subsystem based on the interrelationship of operation of the devices within the respective subsystem. For example, within the electric subsystem, electric subsystem control 62b provides request signals for controlling operation of electric storage device 42 based on the operation of the other devices within the electric subsystem. Similarly, within the hydraulic subsystem, hydraulic subsystem control 62c provides request signals for controlling operation of accumulator 54 based on the operation of the other devices within the hydraulic subsystem.

Subsystem controls 62 are also configured to provide range signals 68 indicative of a range of acceptable electric and hydraulic power levels associated with operation of the electric and hydraulic devices upon receipt of request signals 66. Range signals 68 may also be based on how the device functions within a respective subsystem. For example, for the electric subsystem, range signals 68 for the respective electric devices may be based on the interrelationship of the operation of the electric devices within the electric subsystem, for example, as explained in more detail below with respect to electric storage device 42. Similarly, for the hydraulic subsystem, range signals 68 for the respective hydraulic devices may be based on the interrelationship of the operation of the hydraulic devices within the hydraulic subsystem, for example, as explained in more detail below with respect to accumulator 54.

Supervisory control 64 is configured to determine control signals 70 for controlling operation of engine 32 and the electric and hydraulic devices based on operation signals 72, range signals 68, and request signals 66 indicative of requested operation of the electric and hydraulic devices. In this exemplary manner, controller 58 evaluates operation of engine 32 and the electric and hydraulic devices, the requested operation of the devices, and controls operation of engine 32 and the devices in a coordinated manner to provide the desired machine performance and improve efficiency.

According to some embodiments, the range of acceptable electric power and hydraulic power levels is indicative of maximum and minimum power levels at which the electric and hydraulic devices are permitted to operate upon receipt of request signals 66 by controller 58. For example, the maximum and minimum power levels may be based on the capacity of the respective device to supply power or consume power, or to supply or consume power based on predetermined machine design limits. For example, pump/motor 48*a* may have a maximum pumping power output, and thus, the maximum power output level may be limited to the maximum pumping power output. As viewed from the perspective of engine 32, this would represent a maximum power consumption limit. However, as viewed from the perspective of hydraulic cylinders 24, 26, and 28, accumulator 54, and pump/motor 52, this would represent a maximum power supply limit. Alternatively, the maximum pumping power output of pump/motor 48*a* may be limited based on a predetermined design limit, for example, to avoid excessive wear on pump/motor 48*a* and/or other parts of machine 10.

The minimum power levels of range signals 68 may relate to a predetermined lower limit of acceptable power output. For example, for pump/motors 48*a* and 48*b*, the lower limit may be associated with the minimum power output to provide hydraulic cylinders 24, 26, and 28 with sufficient hydraulic power to hold a load in implement 22 at a current height.

Engine 32 may also provide, via its associated sensors 32*a*, operation signals 72 indicative of the status of engine 32 (e.g., the current power output and speed). Engine subsystem control 62*a* may provide range signals 68 indicative of maximum and minimum power levels at which engine 32 is permitted to operate upon receipt of request signals 66 by controller 58.

According to some embodiments, the ranges of acceptable electric, hydraulic, and engine power output levels provide limits for supervisory control 64, so that supervisory control 64 does not provide control signals 70 for the electric devices, hydraulic devices, and engine 32 that fall outside the respective limits. As a result, although supervisory control 64 may determine a most efficient solution (i.e., based on power consumption considerations alone) for operating the power output levels of engine 32 and the electric and hydraulic devices, the ranges may prevent unintended and undesirable consequences of the most efficient solution.

For example, upon receipt of a request for deceleration of the rotation of cab 16 by controller 58, motor/generator 46 may operate as a generator, thereby supplying electric power to machine 10. If motor/generator 46 increases the level of deceleration of cab 16, it would supply a larger amount of electric power. However, this might result in the rotation of cab 16 stopping more quickly than the request calls for, thereby resulting in undesirable control characteristics. If motor/generator 46 decreases the level of deceleration of cab 16, it would supply a smaller amount of electric power. However, this might result in the rotation of cab 16 stopping more slowly than the request calls for, thereby also resulting in undesirable control characteristics.

When controller 58 receives a request signal 66 for decelerating cab 16, electric subsystem control 62*b* may determine a range of acceptable power supply levels for motor/generator 46 during deceleration. As noted above, because it may not be desirable for operation of machine 10 to reduce or increase the level of deceleration of cab 16, electric subsystem control 62*b* may determine a narrow range of acceptable power supply levels under these circumstances. Thus, electric subsystem control 62*b* would provide to supervisory control 64 request signal 66 indicative of the requested operation of motor/generator 46 and range signal 68 indicative of a narrow range of acceptable power supply levels for motor/generator 46. Supervisory control 64 would thereafter control operation of motor/generator 46 by determining a level of power supply to be provided by motor/generator 46 based on request signals 66, operation signals 72 of engine 32 and the various devices of machine 10, and range signal 68 received from electric subsystem control 62*b*. Thereafter, control signals 70 are provided to motor/generator 46 to control its operation. Control signals 70 may be sent from supervisory control 64 to electric subsystem control 62*b*, which may thereafter control operation of motor/generator 46. According to some embodiments, control signals 70 may be sent directly to motor/generator 46 without necessarily being relayed through electric subsystem control 62*b*.

As another example, during acceleration of cab 16, controller 58 receives request signal 66 for acceleration, and motor/generator 46 operates as a motor, thereby consuming electric power from machine 10. If motor/generator 46 increases the level of acceleration of cab 16, it would consume a larger amount of electric power. If motor/generator 46 decreases the level of acceleration of cab 16, it would consume a smaller amount of electric power.

Electric subsystem control 62*b* may determine a range of acceptable power consumption levels for motor/generator 46 during acceleration of cab 16. For example, it may not be desirable for operation of machine 10 to increase the acceleration of cab 16 beyond the requested level. However, due to power limits in machine 10 or other considerations, it may be desirable to reduce the level of acceleration below the requested level. Thus, electric subsystem control 62*b* may provide a range of acceptable power consumption levels from a maximum equal to the requested level to a minimum well below the requested level. Electric subsystem control 62*b* would provide to supervisory control 64 a request signal 66 indicative of the requested operation of motor/generator 46 and a range signal 68 indicative of the range of acceptable power supply levels. Thereafter, supervisory control 64, using control signals 72, controls operation of motor/generator 46, for example, in the manner previously described, by determining a level of power for consumption by motor/generator 46 based on request signal 66 and range signal 68 received from electric subsystem control 62*a*, and operation signals 72 of engine 32 and the various devices of machine 10.

Electric subsystem control 62*b* may determine a range for operation of electric storage device 42 based on the interrelationship of the operation of the electric devices within the electric subsystem. For example, if no electric devices are operating within electric subsystem, electric subsystem control 62*b* may provide supervisory control 64 with a request signal indicating no requests for electric devices and a range signal 68 for each of the electric devices, which indicates the ability of the electric devices, including electric storage device 42, to supply power to engine 32 and/or hydraulic subsystem via supplement of power to engine 32 for operation of one or more of pump/motors 48a and 48b.

However, if, for example, a request signal 66 is received for rotation of cab 16 (via motor/generator 46), electric subsystem control 62b supplies supervisory control 64 with request signals 66 for each of the electric devices, including electric storage device 42. In addition, electric subsystem control 62b provides range signals 68 for each of the electric devices. For example, request signal 66 for operation of motor/generator 46 for rotation of cab 16 may request 50 units of electric power. Electric subsystem control 62b determines that motor/generator 34 being driven by engine 32 has the ability to provide 40 units of electric power to motor/generator 46 to rotate cab 16, and electric storage device 42 has the ability to provide 40 units of electric power to motor/generator 46 to rotate cab 16. Thus, motor/generator 34 and electric storage device 42 have a total of 30 units of excess capacity to meet the requested rotation of cab 16. Electric subsystem control 62b determines respective range signals 66 for motor/generator 34 and electric storage device 42 indicating a range of power outputs of 0-40 units of power for each of motor/generator 34 and electric storage device 42, and a request signal 66 of 50 units for motor/generator 46 for rotation of cab 16. Electric subsystem control 62b also determines a range signal for motor/generator 46 as outlined previously herein. Also, electric subsystem control 62b determines request signals 66 for each of motor/generator 34 and electric storage device 42 to provide the 50 units of power to motor/generator 46. For example, electric subsystem control 62b determines that the request signal 66 for motor/generator 34 will be 40 units of power, and the request signal for electric storage device 42 will be 10 units of power, thereby corresponding to the 50 units of electric power requested for operation of motor/generator 46 to rotate cab 16. The request signals 66 and range signals 68 are supplied to supervisory control 64.

In this example, supervisory control 64 uses the request and range signals 66 and 68 from electric subsystem control 62b, as well as similar signals from engine subsystem control 62a and hydraulic subsystem control 62c, to determine control signals 70 for controlling operation of engine 32 and the electric and hydraulic devices of machine 10. For example, if electric power is not needed for supplementing engine 32 or the hydraulic system, supervisory control 64 may provide control signals 70 to electric subsystem control 62b, such that motor/generator 34 supplies, for example, 40 units of power to motor/generator 46, and electric storage device 42 supplies 10 units of power to motor/generator 46, thereby meeting the requested 50 units to rotate cab 16.

However, if supervisory control 64 determines that the hydraulic subsystem would benefit from power supplied by the electric subsystem, for example, if the hydraulic subsystem is unable to supply enough hydraulic power to meet the requested operation demands of the hydraulic subsystem, for example, because of limited capability of engine 32 and/or an inability of accumulator 54 to offset the limited capability of engine 32, supervisory control 64 may determine that the electric subsystem may supply power to supplement operation of engine 32 by, for example, 20 units of power, thereby increasing the capability of the hydraulic subsystem. Because the output of pump/motors 48a and 48b may be limited due to instantaneous engine capability, supplementing operation of engine 32 with the electric subsystem may enable an increase in the hydraulic power pump/motors 48a and 48b may supply. Thus, in order to meet the 20-unit power demand for supplementing engine 32 and the 50-unit power demand of the request to rotate cab 16, 70 units of power may be supplied from the combined 80 units of available power from motor/generator 34 and electric storage device 42, so that 50 units are supplied to rotate cab 16, and 20 units are supplied to hydraulic subsystem via power supplied to engine 32.

In a similar manner, hydraulic subsystem control 62c may determine a range for operation of accumulator 54 based on the interrelationship of the operation of the hydraulic devices within the hydraulic subsystem. For example, if no hydraulic devices are operating within hydraulic subsystem, hydraulic subsystem control 62c may provide supervisory control 64 with a request signal indicating no requests for hydraulic devices and a range signal 68 for each of the hydraulic devices, which indicates the ability of the hydraulic devices, including accumulator 54, to supply power to engine 32 and/or electric subsystem via supplement of power to engine 32 for operation of motor/generator 34 of the electric subsystem.

However, if, for example, a request signal 66 is received for movement of machine 10 (via pump/motor 52 and ground engaging members 14), hydraulic subsystem control 62c supplies supervisory control 64 with request signals 66 for each of the hydraulic devices, including accumulator 54. In addition, hydraulic subsystem control 62c provides range signals 68 for each of the hydraulic devices. For example, request signal 66 for operation of pump/motor 52 for movement of machine 10 may request 60 units of electric power. Hydraulic subsystem control 62c determines that pump/motors 48a and 48b being driven by engine 32 have the ability to provide 50 units of hydraulic power to motor/generator 46 to move machine 10, and accumulator 54 has the ability to provide 30 units of hydraulic power pump/motor 52 to move machine 10. (According to some embodiments, hydraulic cylinders 24, 26, and/or 28 may be used to supply hydraulic power to pump/motor 52, as described previously herein.) Thus, pump/motors 48a and 48b and accumulator 54 have a total of 20 units of excess capacity to meet the requested movement of machine 10. Hydraulic subsystem control 62c determines respective range signals 66 for pump/motors 48a and 48b and accumulator 54 indicating a range of power outputs of 0-50 units for pump/motors 48a and 48b and 0-30 units of power for accumulator 54, and a request signal 66 of 60 units for pump/motor 52 for movement of machine 10. Hydraulic subsystem control 62c also determines a range signal for pump/motor 52 as outlined previously herein. Also, hydraulic subsystem control 62c determines request signals 66 for each of pump/motors 48a and 48b and accumulator 54 to provide the 60 units of power to pump/motor 52. For example, hydraulic subsystem control 62c determines that the request signal 66 for pump/motors 48a and 48b will be 50 total units of power, and the request signal 66 for accumulator 54 (and/or hydraulic actuators 24, 26, and/or 28) will be 10 units of power, thereby corresponding to the 60 units of hydraulic power requested for operation of pump/motor 52 to move machine 10. The request signals 66 and range signals 68 are supplied to supervisory control 64.

In this example, supervisory control 64 uses the request and range signals 66 and 68 from hydraulic subsystem control 62c, as well as similar signals from engine subsystem control 62a and electric subsystem control 62b, to determine control signals for controlling operation of engine 32 and the electric and hydraulic devices of machine 10. For example, if hydraulic power is not needed for supplementing engine 32 or the electric subsystem, supervisory control 64 may provide control signals 70 to hydraulic subsystem control 62c, such that pump/motors 48a and 48b supply, for example, 50 units of power to pump/motor 52, and accumulator 54 supplies 10 units of power to pump/motor 52, thereby meeting the requested 60 units to move machine 10.

However, if supervisory control 64 determines that the electric subsystem would benefit from power supplied by the hydraulic subsystem, for example, if the electric subsystem was unable by itself to supply enough electric power to meet the requested operation demands of the electric subsystem, supervisory control 64 may determine that the hydraulic subsystem may supply power to supplement operation of engine 32 by, for example, 20 units of power. Thus, in order to meet the 20-unit power demand for supplementing engine 32 and the 60-unit power demand of the request to move machine 10, 80 units of power may be supplied from the combined 80 units of available power from pump/motors 48a and 48b and accumulator 54, so that 60 units are supplied to move machine 10, and 20 units are supplied to electric subsystem via power supplied to engine 32.

Figure 4:
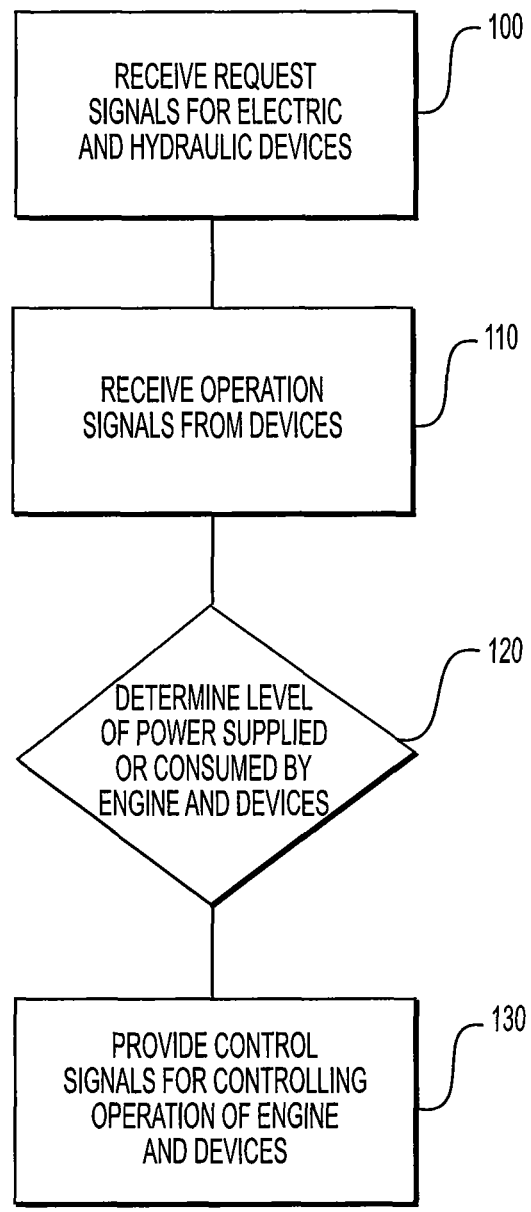
FIG. 4 is a flow diagram of an exemplary embodiment of a method for controlling power in an exemplary machine.

FIG. 4 shows a flow diagram of an exemplary embodiment of a method for controlling power in exemplary machine 10. As shown in FIG. 4, exemplary method begins at step 100 with receipt of request signals 66 indicative of requested operation of the electric and hydraulic devices by controller 58 from, for example, operator interface 56. Upon receipt of request signals 66, at step 110 controller 58 receives operation signals 72 from the various sensors associated with operation of engine 32 and the electric and hydraulic devices. Operation signals 72 are indicative of the status of engine 32 and the electric and hydraulic devices, for example, and may provide information about the current capabilities of engine 32 and the various devices, such as the current power output, the current level of energy storage, the current power consumption, and the current ability to supply or consume power.

Following receipt of request signals 66 and operation signals 72, at step 120 controller 58 determines the level of power to be supplied or consumed by engine 32 and the various electric and hydraulic devices of machine 10. In this exemplary method, this determination is made based on request signals 66, operation signals 72, and control strategy 60 for controlling electric and hydraulic power for machine 10, for example, by controlling operation of engine 32 and the electric and hydraulic devices.

According to the exemplary embodiment described previously herein, control strategy 60 includes engine subsystem control 62a for controlling engine 32, electric subsystem control 62b for controlling the electric devices of machine 10, and hydraulic subsystem control 62c for controlling the hydraulic devices of machine 10. Exemplary control strategy 60 also includes supervisory control 64, which provides at step 130 control signals 70 for controlling operation of engine 32 and the electric and hydraulic devices based on request signals 66, operation signals 72, and signals received from engine subsystem control 62a, electric subsystem control 62b, and hydraulic subsystem control 62c. Subsystem controls 62 provide range signals 68 indicative of the range of acceptable power levels (power consumption or supply levels) associated with operation of engine 32 and the electric and hydraulic devices.

Supervisory control 64 is configured to determine control signals 70 for controlling operation of engine 32 and the electric and hydraulic storage devices and for distributing power to and from the electric and hydraulic devices and engine 32. In particular, supervisory control 64 determines control signals such that engine 32 may be operated within a speed range of a target engine speed. For example, engine 32 may be operated at a relatively low and relatively constant speed. For example, engine 32 may be operated within a speed range of a target engine speed of 1,000 to 3,000 rpm, for example, 1,400 rpm. The speed range may be, for example, 300 rpm, 200 rpm, or 100 rpm. The target engine speed may substantially correspond to an engine speed at which the peak torque is available. This operation of engine 32 may be achieved by supplementing the output of engine 32 as different demands are placed on machine 10 by operation of the various electric and hydraulic devices. Normally, such operation would result in placing transient loads on engine 32, and engine 32 would respond by changing engine speeds and torque to meet the transient loads. However, exemplary supervisory control 64 determines control signals 70 for engine 32 and the electric and hydraulic devices that result in reducing the transient loads on engine 32, such that engine 32 may be operated at a relatively constant speed.

For example, operation of pump/motors 48a and 48b and motor/generator 34 may be controlled by controller 58, such that they either supply engine 32 with power or receive power from engine 32 in a manner resulting in the load on engine 32 being controlled, so that engine 32 substantially maintains a speed within a speed range of the target engine speed. In particular, if requested operation of an electric device or a hydraulic device calls for increasing the load on engine 32, controller 58 determines and sends control signals 70 to one or more of pump/motors 48a and 48b and motor/generator 34, so that they can supplement the power output of engine 32, thereby reducing the load on engine 32. According to some embodiments, as engine 32 initially responds to the requested operation, one or more of pump/motors 48a and 48b and motor/generator 34 supplies power to engine 32. Pump/motors 48a and 48b may be supplied with hydraulic power from accumulator 54, and motor/generator 34 may be supplied with electric power from electric storage device 42. This reduces change in engine speed so that the speed of engine 32 remains within a speed range of the target engine speed. According to some embodiments, as the load due to the requested operation continues over a period of time, the power supplementing engine 32 may be gradually reduced. Thereafter, if controller 58 determines that engine 32 should supply all of the power to meet the requested operation, then power supplementation will cease.

On the other hand, upon the cessation of requested operation of electric or hydraulic storage devices, in order to prevent engine 32 from increasing its speed outside the speed range as the load on engine 32 is withdrawn, controller 58 may determine and send control signals 70 to one or more of pump/motors 48a and 48b and motor/generator 34 to consume power from engine 32. As engine 32 responds to the reduction in load and operation stabilizes at the target engine speed, pump/motors 48a and 48b and motor/generator 34 reduce the consumption of power from engine 32. As pump/motors 48a and 48b and motor/generator 34 are consuming power from engine 32, this power may be stored in one or more of accumulator 54 and electric storage device 42 for later use. In this exemplary manner, controller 58 controls operation of engine 32, and the electric and hydraulic devices so that engine 32 can be operated at a speed within a speed range of a target engine speed.

According to some embodiments, controller 58 may be configured to reduce the amount of power supplied to the electric and hydraulic devices to a level below the requested power level, for example, when the requested power associated with requested operation of the electric and hydraulic devices exceeds either a predetermined maximum power (e.g., based machine design limits) or the capability of engine 32 and the electric and hydraulic devices to meet the requested power level. For example, if the sum of the power requests exceeds the machine design limits or the design limits of the electric and hydraulic devices, controller 58 is configured to reduce the power requests so that the sum of the power requests no longer exceeds the predetermined maximum power or the capability of engine 32, and the electric and hydraulic devices to meet the requested power level.

According to some embodiments, if the requested power level associated with operation of the electric devices exceeds either a predetermined maximum available electric power or the capability of machine 10 to meet the requested power level, controller 58 is configured to reduce the electric power requests and hydraulic power requests, so that the electric power requests no longer exceed the predetermined maximum power or the capability of machine 10 to meet the electric power request. Similarly, according to some embodiments, if the requested power associated with operation of the hydraulic devices exceeds either a predetermined maximum available hydraulic power or the capability of machine 10 to meet the requested power, controller 58 is configured to reduce the hydraulic power requests and electric power requests, so that the hydraulic power request no longer exceeds the predetermined maximum power or the capability of machine 10 to meet the hydraulic power request. This may result in a balanced operation of the electric and hydraulic devices when power requests exceed either the predetermined maximum available power or the capability of machine 10 to meet the power requests.

According to some embodiments, if controller 58 reduces the requested power, the reduced power may be based on predetermined power output ratios associated with each of the electric and hydraulic devices. For example, if controller 58 determines reduced power output levels for operation of the electric and hydraulic devices, power output ratios may be used to reduce the power output in a balanced manner to provide predictable relative operation between the electric and hydraulic devices. For example, if operation of boom actuator 28 is reduced 50%, operation of motor/generator 46 may be reduced a similar amount (e.g., 40-60%) based on the power output ratios. By use of power output ratios, operation of the electric and hydraulic devices may be reduced according to predetermined prioritization. The power output ratios may be determined through calculation and/or experiment to provide a desired balance of operation among the devices.

According to some embodiments, supervisory control 64 implements the above-identified strategies in two steps. The first step involves determining the role of electric and hydraulic storage devices in either supplying power to engine 32 or consuming (storing) power received from engine 32. The second step involves determining and controlling power distribution among engine 32 and the electric and hydraulic devices.

Regarding the first step, electric subsystem control 62b and hydraulic subsystem control 62c provide supervisory control 64 with requests for the electric and hydraulic storage devices to either supply power to engine 32 or consume power from engine 32. Upon receipt, supervisory control 64 determines whether or not to adjust these requests. According to some embodiments, supervisory control 64 makes this first-step determination in four sub-steps.

In a first sub-step 200 (FIG. 5A), supervisory control 64 determines the maximum amount that each of the electric and hydraulic storage device requests can be adjusted, and the maximum amount that the total of the requests for the electric and hydraulic storage devices can be adjusted. The determinations may be based on power balancing and the capabilities of each of the electric and hydraulic devices of machine 10. In particular, the maximum adjustments may be based on (1) the range signals 68 for each electric and hydraulic device, (2) the power supply or consumption that results in substantially constant engine speed, (3) the predetermined design limits of machine 10, (4) the predetermined design limits of engine 32 and the electric and hydraulic devices, and/or (5) the request signals 66 associated with each of the electric and hydraulic devices. If supervisory control 64 determines that engine 32 will not be able to respond quickly enough to substantially maintain the target engine speed, and the total requested power level is within machine design limits, supervisory control 64 will send control signals 70 to the electric and hydraulic storage devices to supplement the output of engine 32, so that engine 32 can substantially maintain the target engine speed, and the requested power can be provided to the electric and hydraulic devices for operation.

Figure 5A:
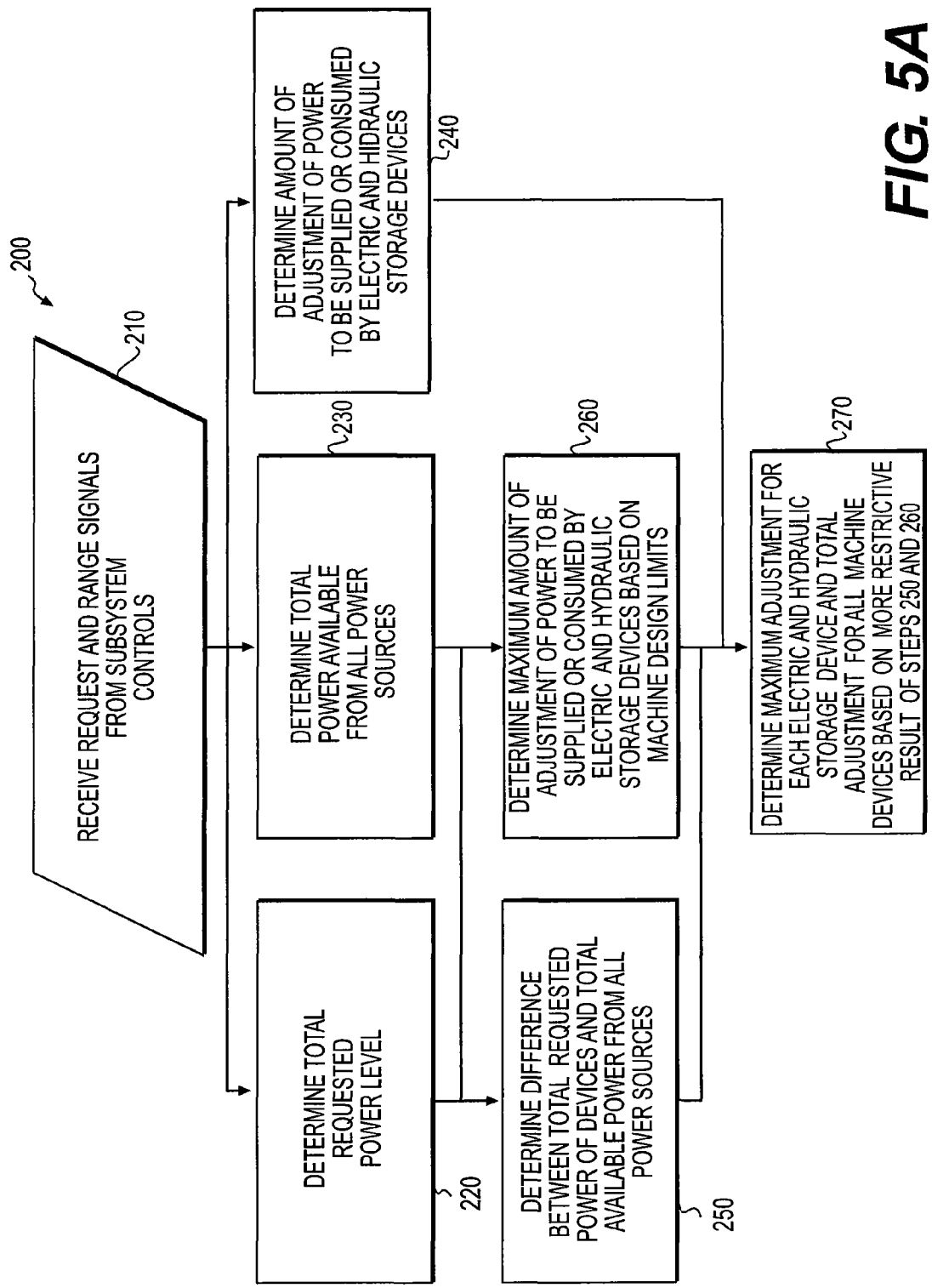
FIGS. 5A-5D are flow diagrams of exemplary sub-steps of an exemplary embodiment of a method for controlling power in an exemplary machine.

FIG. 5A is a flow diagram showing an example of how first sub-step 200 may be performed. As shown in FIG. 5A, in first sub-step 200, supervisory control 64 at step 210 receives request signals 66 and range signals 68 from engine subsystem control 62a, electric subsystem control 62b, and hydraulic subsystem control 62c for each of the devices of machine 10. At step 220, supervisory control 64 determines the total power level requested for all the devices of machine 10 upon receipt of the request signals. At step 230, supervisory control 64 determines the total amount of power available from all power sources of machine 10. At step 240, supervisory control 64 determines, based on the range signals 68 for the electric and hydraulic storage devices, how much adjustment can be made to the level of power to be supplied or consumed by the electric and hydraulic storage devices relative to the level of power associated with the request signals 66. In particular, electric subsystem control 62b and hydraulic subsystem control 62c provide request signals 66 to supervisory control 64 indicative of the requested level of power to be supplied or consumed (stored) by the electric and hydraulic storage devices. Electric subsystem control 62b and hydraulic subsystem control 62c also provide supervisory control 64 with range signals 68 indicative of an allowable amount of adjustment from the requested level of power for the electric and hydraulic storage devices. At step 240, based on these range signals 68, supervisory control 64 determines how much total adjustment can be made to the total power level requested for the electric and hydraulic storage devices, and how much adjustment can be made to the power level requested for each of the electric and hydraulic storage devices.

At step 250, supervisory control 64 determines the difference between the total requested power of the devices of machine 10 and the total available power from the power sources of machine 10 based on the total adjustment to the total power level in step 240. At step 260, supervisory control 64 determines the maximum adjustment available based on machine design limits. At step 270, supervisory control 64 determines the maximum adjustment available for each of the electric and hydraulic storage devices and the total adjustment for all devices of machine 10 based on the more restrictive result from steps 250 and 260.

According to a second sub-step 300 (FIG. 5B), supervisory control 64 determines the level of adjustment of power supply or consumption for the electric and hydraulic storage devices. Supervisory control 64 determines the level of power available in each of the electric and hydraulic storage devices and determines the amount of adjustment available based on the level of power available. If the total available adjustment for the electric and hydraulic storage devices exceeds the desired level of adjustment and is within machine design limits, power output ratios are used to prioritize the level of adjustment of each of the electric and hybrid storage devices.

Figure 5B:
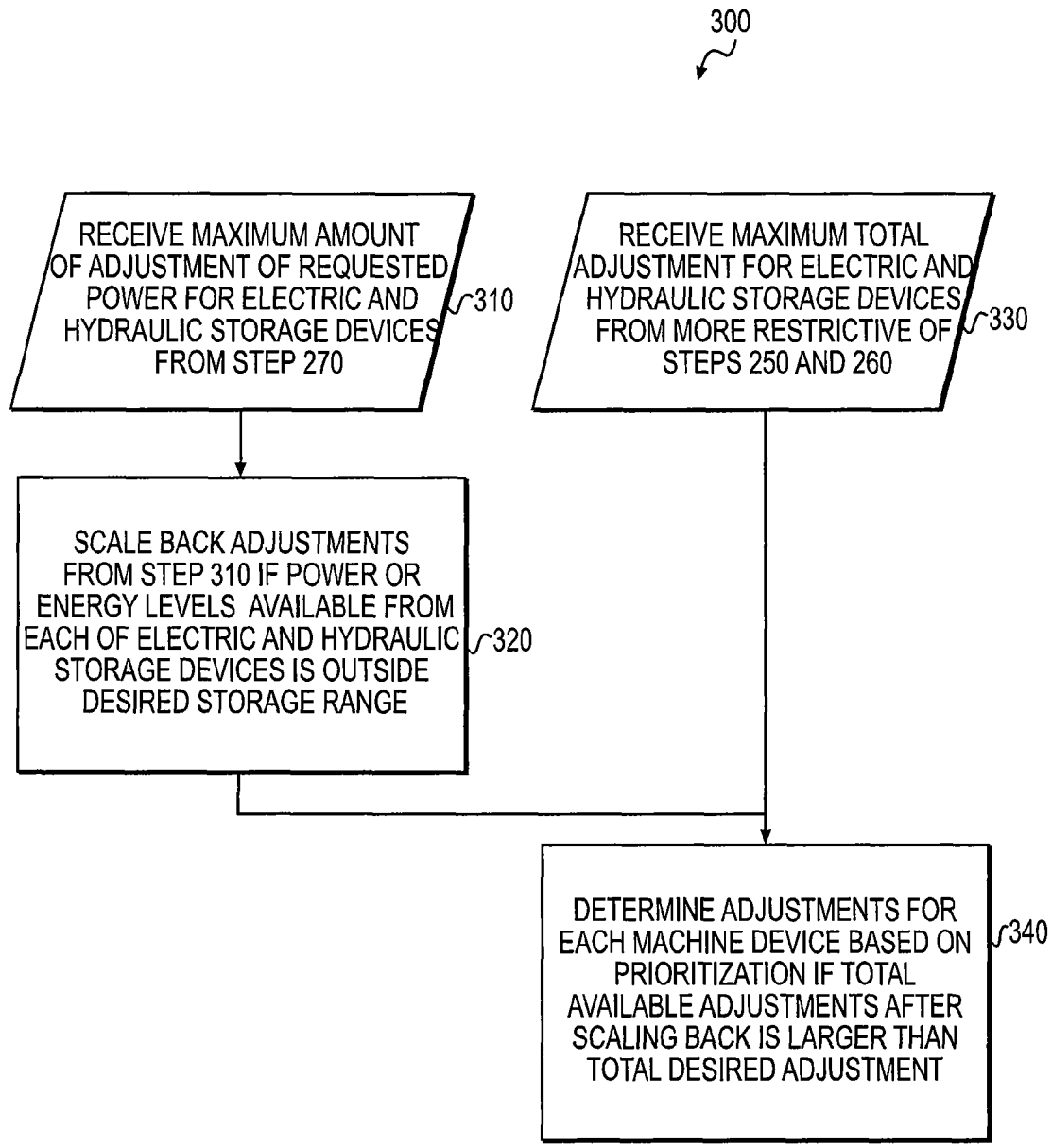

FIG. 5B is a flow diagram showing an example of how second sub-step 300 may be performed. As shown in FIG. 5B, supervisory control 64 at step 310 receives the maximum amount of adjustment that can be made to requested power levels for each of the electric and hydraulic storage devices from first sub-step 200. Based on this information, at step 320, supervisory control 64 scales back the adjustments for each of the electric and hydraulic devices of machine 10 if the power or energy level available from each of the electric and hydraulic storage devices is outside of the desired range of storage. At step 330, supervisory control 64 receives the maximum total adjustment for the electric and hydraulic storage devices from first sub-step 200. At step 340, if the total available adjustments after scaling back individual devices is larger than the total desired adjustment, supervisory control 64 determines adjustments for each of the devices based on prioritization via the power level ratios associated with each device.

Figure 5C:
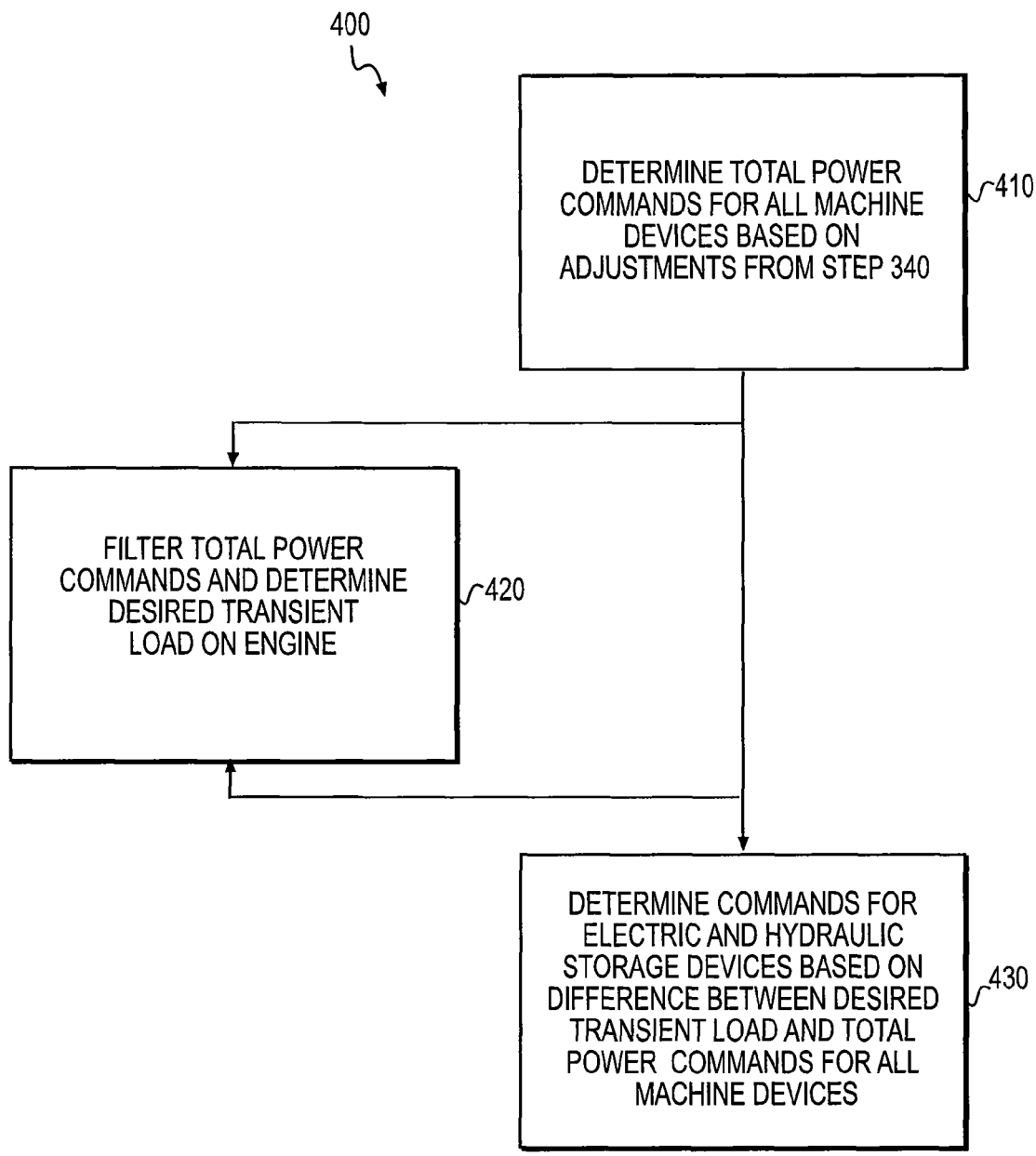

In a third sub-step 400 (FIG. 5C), if the electric and hydraulic storage devices would be operating within the ranges provided by subsystem control 62, the power output or consumption of the electric and hydraulic storage devices is adjusted to supplement engine 32, such that it substantially maintains the target engine speed. FIG. 5C is a flow diagram showing an example of how third sub-step 400 may be implemented. At step 410, supervisory control 64 sums the device commands. At step 420, supervisory control 64 filters the total command obtained in step 410 to determine a desired transient engine load. The desired transient engine load may be based on the load on engine 32 to which engine 32 can respond without substantially deviating from the target engine speed. At step 430, supervisory control 64 determines the adjustment of the electric and hydraulic storage devices based on the difference between the desired engine transient load from step 420 and the sum of the device commands from step 410. As a result, the electric and hydraulic devices of machine 10 respond to operation requests, and engine 32 substantially maintains the target engine speed.

Figure 5D:
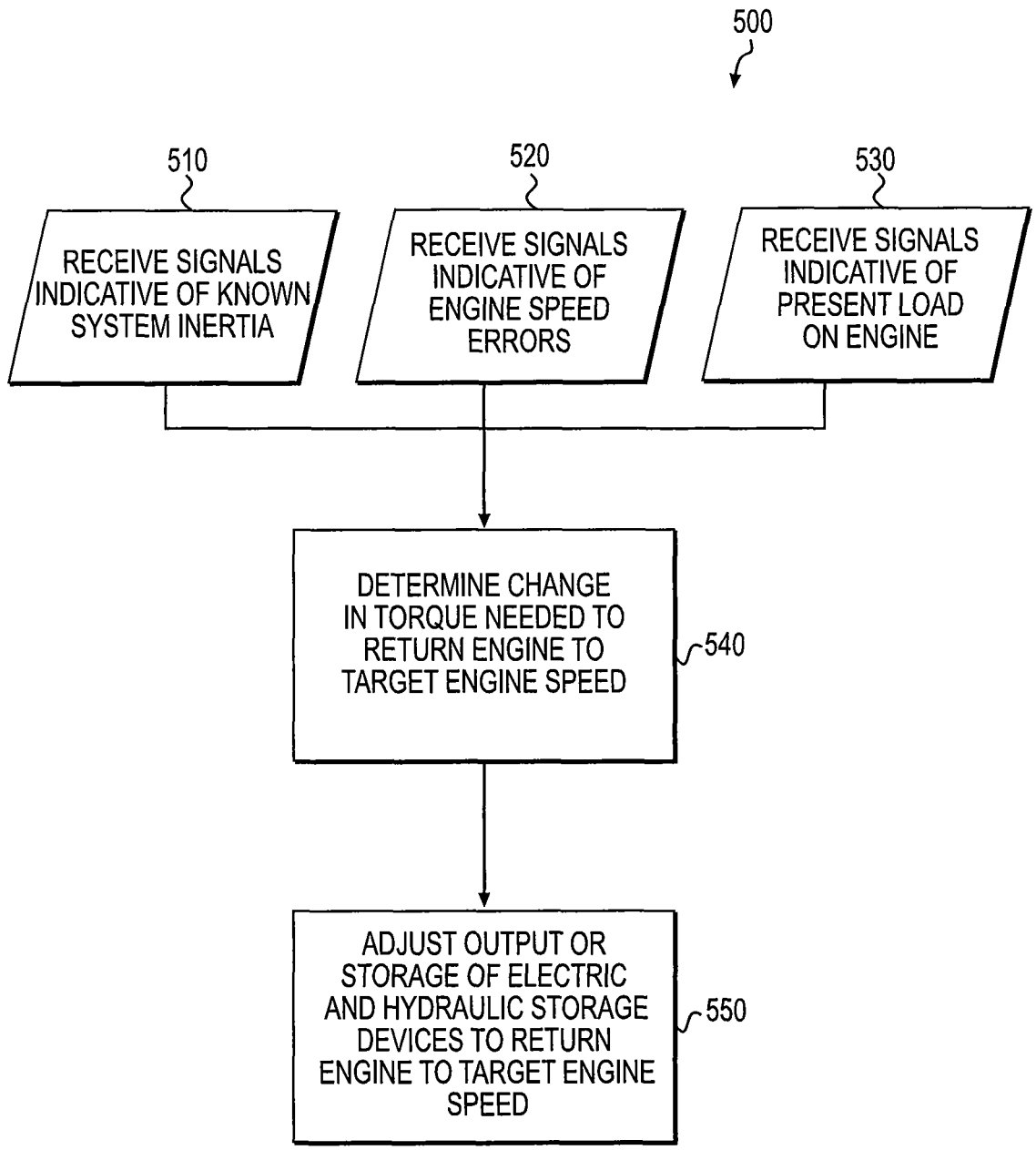

In a fourth sub-step 500 (FIG. 5D), supervisory control 64 monitors engine speed and if it deviates from the target engine speed due to, for example, control errors and/or control delays, supervisory control 64 makes additional adjustments to the power supplementation to engine 32 by the electric and hydraulic storage devices via control signals 70. FIG. 5D is a flow diagram showing an example of how fourth sub-step 500 may be implemented. At step 510, supervisory control 64 receives signals indicative of known system inertia. At step 520, supervisory control 64 receives signals indicative of engine speed errors, and at step 530, supervisory control 64 receives signals indicative of the present load on engine 32. At step 540, supervisory control 64 determines a change in torque needed to return engine 32 to the target engine speed. At step 550, supervisory control 64 adjusts the output or storage of power of the electric and hydraulic storage devices to provide the torque (positive or negative) required to return engine 32 to the target engine speed.

In the second step of the exemplary control strategy, supervisory control 64 sends control signals 70 to all the electric and hydraulic devices based on the request signals 66 and range signals 68 received from subsystem control 62, any prioritization due to power balancing, and the power supply or consumption of the electric and hydraulic storage devices determined by supervisory control 64 in the first step of the strategy.

According to this exemplary method, the power in machine 10 may be controlled in a manner resulting in machine 10 having desired operation characteristics and improved efficiency. In particular, engine 32 and the electric and hydraulic devices may be operated in a coordinated manner, so that they consume and supply power to machine 10 in an efficient manner, while still maintaining desirable operation characteristics.

The exemplary systems and methods described above include a combination of electric and hydraulic devices and a combination of electric and hydraulic storage devices. It is contemplated that the systems and methods described herein may not include both electric and hydraulic devices, or may not include both electric and hydraulic storage devices. For example, the systems and methods may be used in machines having electric devices and electric storage devices, or a combination of electric devices, electric storage devices, and non-hydraulic devices (e.g., non-hydraulic storage devices, such as, for example, a non-hydraulic, mechanical storage device such as a flywheel). Alternatively, the systems and methods may be used in machines having hydraulic devices and hydraulic storage devices, or a combination of hydraulic devices, hydraulic storage devices, and non-electric devices (e.g., non-electric storage devices, such as, for example, a non-electric, mechanical storage device such as a flywheel).

INDUSTRIAL APPLICABILITY

Exemplary machine 10 may be used for performing work. In particular, exemplary machine 10 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

Exemplary system 55 for controlling power in machine 10 may be used to control power in a machine having both electric and hydraulic devices that may act as either power suppliers or consumers. In particular, exemplary system 55 controls the power supply and consumption of the electric and hydraulic devices in a manner that improves the efficiency of a machine, while maintaining desirable control characteristics of the machine. The electric and hydraulic devices may include electric and hydraulic storage devices as well as electric and hydraulic actuators, such as, for example, electric motors, electric generators, electric motor/generators, hydraulic pumps, hydraulic motors, hydraulic pump/motors, and hydraulic cylinders. By virtue of controlling operation of engine 32 and the electric and hydraulic devices in the exemplary manner described herein, engine 32 may be operated at a substantially constant engine speed and/or at a desired level of torque. This may result in more efficient operation of engine 32, while still maintaining the desired responsiveness of the electric and hydraulic devices.

It will be apparent to those skilled in the art that various modifications and variations can be made to the exemplary disclosed systems, methods, and machine. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for controlling power in a machine comprising an engine configured to provide power to an electric device and a hydraulic device and receive power from the electric device and the hydraulic device, the system comprising:
   a controller configured to:

receive request signals indicative of a requested operation of at least one device of the electric device and the hydraulic device;

determine a requested level of power required to meet the requested operation based on the request signals;

determine an ability of the engine to supply the requested level of power upon receipt of the request signals;

provide control signals to the electric device and the hydraulic device to supply power to the engine if the engine is unable to supply the requested level of power; and provide control signals to the engine to control speed and output of the engine, wherein the control signals provided to the engine, the electric device, and the hydraulic device result in operation of the engine within a speed range of a target engine speed.

2. The system of claim 1, wherein the electric device is configured to provide electric power and consume electric power, and the hydraulic device is configured to provide hydraulic power and consume hydraulic power, and wherein the request signals are indicative of a requested operation of at least one of the electric and hydraulic devices, wherein the controller is also configured to provide control signals to the electric and hydraulic devices to receive power from the engine if the engine is capable of providing the requested level of power, and wherein the control signals provided to the engine and electric and hydraulic devices result in operation of the engine within the speed range of the target engine speed.

3. The system of claim 2, wherein the request signals are indicative of initiation of the requested operation, and wherein the control signals result in at least one of the electric device and the hydraulic device supplying power to the engine.

4. The system of claim 3, wherein the control signals result in supplying power to the engine at a first level upon receipt of the request signals, and wherein the level of power supplied to the engine is gradually reduced thereafter.

5. The system of claim 2, wherein the request signals are indicative of cessation of the requested operation, and wherein the control signals result in the engine supplying power to at least one of the electric device and the hydraulic device.

6. The system of claim 5, wherein the control signals result in the engine supplying power to the at least one electric and hydraulic device at a first level upon receipt of the request signals, and wherein the level of power supplied to the at least one electric and hydraulic device is gradually reduced thereafter.

7. The system of claim 1, wherein the speed range is 300 rpm.

8. The system of claim 2, wherein the controller is further configured to:

receive a signal indicative of a requested electric operation of the electric device, the requested electric operation corresponding to a requested electric power level;

receive a signal indicative of a requested hydraulic operation of the hydraulic device, the requested hydraulic operation corresponding to a requested hydraulic power level;

compare a combined requested power level of a sum of the requested electric and hydraulic power levels to a combined maximum available power level; and wherein if the combined maximum available power level is less than the combined requested power level;

provide a control signal for supplying an amount of electric power to the electric device at a level less than the requested electric power level, and provide a signal for supplying an amount of hydraulic power to the hydraulic device at a level less than the requested hydraulic power level.

9. The system of claim 8, wherein the combined maximum available power level is based on a lesser of either a predetermined maximum power level or a level of power available from the engine and the electric and hydraulic devices upon receipt of the signals indicative of the requested operation.

10. The system of claim 8, wherein the level less than the requested electric power level is based on a predetermined electric power output ratio associated with the electric device, and the level less than the requested hydraulic power level for the hydraulic device is based on a predetermined hydraulic power output ratio associated with the hydraulic device.

11. A method for controlling power in a machine comprising an electric device configured to provide electric power and consume electric power, a hydraulic device configured to provide hydraulic power and consume hydraulic power, and an engine configured to provide power to the electric and hydraulic devices and receive power from the electric and hydraulic devices, the method comprising:

receiving request signals indicative of requested operation of at least one of the electric and hydraulic devices;

determining a requested level of power required to meet the requested operation based on the request signals;

determining an ability of the engine to supply the requested level of power upon receipt of the request signals;

operating the electric and hydraulic devices to supply power to the engine if the engine is unable to supply the requested level of power; and operating the engine and the electric and hydraulic devices such that the engine is operated within a speed range of a target engine speed.

12. The method of claim 11, wherein the request signals are indicative of initiation of the requested operation, and wherein the method includes supplying power to the engine via at least one of the electric device and the hydraulic device.

13. The method of claim 12, wherein supplying power to the engine includes supplying power at a first level upon receipt of the request signals and gradually reducing the level of power supplied to the engine thereafter.

14. The method of claim 11, wherein the request signals are indicative of cessation of the requested operation, and wherein the method includes supplying power to at least one of the electric device and the hydraulic device via the engine.

15. The method of claim 14, wherein supplying power to at least one of the electric device and the hydraulic device includes supplying power at a first level upon receipt of the request signals and gradually reducing the level of power supplied to at least one of the electric device and the hydraulic device thereafter.

16. A machine comprising:

a chassis;

an operator interface for controlling operation of the machine;

an engine coupled to the chassis;

an electric device coupled to the chassis;

a hydraulic device coupled to the chassis; and a controller configured to:

receive request signals indicative of requested operation of at least one of the electric and hydraulic devices;

determine a requested level of power required to meet the requested operation based on the request signals;

determine an ability of the engine to supply the requested level of power upon receipt of the request signals;

provide control signals to the electric and hydraulic devices to supply power to the engine if the engine is unable to supply the requested level of power; and provide control signals to the engine to control speed and output of the engine, wherein the control signals provided to the engine and electric and hydraulic devices result in operation of the engine within a speed range of a target engine speed.

17. The machine of claim 16, wherein the electric device includes a motor/generator coupled to the engine and configured to receive power from the engine or supply power to the engine, and wherein the machine further includes an electric storage device coupled to the motor/generator and configured to supply electric power to the motor/generator or receive power from the motor/generator.

18. The machine of claim 17, wherein the electric storage device includes at least one of a battery and an ultra-capacitor.

19. The machine of claim 17, wherein the request signals are indicative of initiation of operation of the hydraulic device, and wherein the control signals include a signal configured to result in the motor/generator supplying power to the engine, such that the engine operates within the speed range.

20. The machine of claim 17, wherein the request signals are indicative of cessation of operation of the hydraulic device, and wherein the control signals include a signal configured to result in the engine supplying power to the motor/generator, such that the engine operates within the speed range.

21. The machine of claim 16, wherein the hydraulic device includes a pump/motor coupled to the engine and configured to receive power from the engine or supply power to the engine, and wherein the machine further includes a hydraulic storage device coupled to the pump/motor and configured to supply hydraulic power to the pump/motor or receive power from the pump/motor.

22. The machine of claim 21, wherein the hydraulic storage device includes an accumulator.

23. The machine of claim 21, wherein the request signals are indicative of initiation of operation of the electric device, and wherein the control signals include a signal configured to result in the pump/motor supplying power to the engine, such that the engine operates within the speed range.

24. The machine of claim 21, wherein the request signals are indicative of cessation of operation of the electric device, and wherein the control signals include a signal configured to result in the engine supplying power to the pump/motor, such that the engine operates within the speed range.

25. The machine of claim 16, further including:

a cab rotatably mounted on the chassis;

a boom pivotally coupled to the cab;

a stick pivotally coupled to the boom; and an implement pivotally coupled to the stick, wherein the electric device includes a motor/generator coupled to the cab and the chassis for rotating the cab with respect to the chassis, and wherein the hydraulic device includes a pump/motor, and the machine further includes:

a first hydraulic cylinder coupled to the cab and the boom for pivotally moving the boom with respect to the cab, a second hydraulic cylinder coupled to the boom and the stick for pivotally moving the stick with respect to the boom, and a third hydraulic cylinder coupled to the stick and the implement for pivotally moving the implement with respect to the stick, and wherein the pump/motor is configured to supply power to the hydraulic cylinders.

\* \* \* \* \*